United States Patent
Harris

[15] 3,657,836
[45] Apr. 25, 1972

[54] FISHING PLUG WITH PAIRED SNAGLESS HOOKS

[72] Inventor: Raymond Harris, 1030 Fourth Street, Saraland, Ala. 36571

[22] Filed: Apr. 13, 1970

[21] Appl. No.: 27,547

[52] U.S. Cl. ........................................... 43/42.41
[51] Int. Cl. ........................................ A01k 85/00
[58] Field of Search ........................... 43/42.41, 35

[56] References Cited

UNITED STATES PATENTS

| | | | |
|---|---|---|---|
| 872,817 | 12/1907 | Hipp | 43/35 |
| 2,884,731 | 5/1959 | Hodgson et al. | 43/35 |
| 2,215,908 | 9/1940 | Lauby | 43/42.41 |
| 1,173,694 | 2/1916 | Witty | 43/35 |
| 1,362,562 | 12/1920 | Doane | 43/42.41 X |
| 2,814,149 | 11/1957 | Hunicke | 43/42.41 |

Primary Examiner—Samuel Koren
Assistant Examiner—Daniel J. Leach
Attorney—Clarence A. O'Brien and Harvey B. Jacobson

[57] ABSTRACT

A fishing plug provided on opposite forward sides with a first pair of spring-biased normally expanded but squeezable fishhooks and at its rearward tail end with a second pair of dorsal and ventral hooks. The barbed bends of the hooks at the headed forward end cross each other and are nested and cocked in recesses and spring out when the yieldable external shanks are sprung toward each other. The barbed bends of the second pair of hooks operate through an eye at the tail end and the barbs are cocked against diametrically opposite exterior surfaces of the plug. The use of paired forward and rearward hooks insures snagless fishing.

7 Claims, 5 Drawing Figures

Raymond Harris
INVENTOR.

FISHING PLUG WITH PAIRED SNAGLESS HOOKS

This invention relates to artificial fishing baits and, more particularly, to a colorful buoyant plug shaped to represent an attractive minnow and provided with forward and rearward yieldingly mounted, normally cocked barbed hooks, said hooks being paired and uniquely mounted, pressure responsive, and coming into play when a fish swallows the hook-equipped plug.

Persons conversant with the field of invention under consideration are aware that it is not new, broadly stated, to provide an artificial lure or bait wherein a minnow-like plug is slotted and wherein spring-biased hooks are operatively mounted in such a manner that the barbed ends are hidden and concealed in a slot and which are adapted to be sprung out to fish catching position when the bait is taken and at which time the barbed bills are embedded or lodged in the jaws of the victim fish. One prior art adaptation exemplary of the state of the art is the John A. Witty "Artificial Bait" U.S. Pat. No. 1,173,694, of Feb. 29, 1916.

An object of the present invention is to improve upon prior art fishing lures having paired weedless fishhooks.

In carrying out the principles of the present invention the wooden, plastic or equivalent elongated plug is shaped and proportioned to imitate an attractive minnow. For effective results and, as experience has shown, the disclosed adaptation is unique in that it has a first pair of spring-biased normally expanded but squeezable fishhooks which are located at diametrically opposite side surfaces of the headed or forward end. The body portion is provided with a slot and coacting recess means to accommodatingly conceal and maintain the barbed hooks in concealed but ready-to-function position when gripped and squeezed by the fish. A second pair of hooks is located on dorsal and ventral surfaces, respectively, at the tail end. These hooks likewise have crossed barbed bends but are passed through an eye provided therefor on the terminal tail end and and have their barbed portions lodged normally against diametrically opposite surfaces of the tail end in readiness to spring out when responsively actuated by the fish.

Briefly, it should be noted that the invention disclosed is an innovation in that in addition to the paired forward and rearward pressure-responsive springy hooks, the individual hooks are structurally and functionally novel. This is to say the shank portion of each hook is flat-faced and elongated and constitutes a highly sensitive tang. The tangs of the respective paired hooks diverge outwardly and rearwardly from the cooperating plug surfaces and have forward ends which are fashioned into eyes which in turn are secured to the intervening plug portion. By flattening the elongated tangs they are not only yieldingly and controllably sensitive but provide effective biting surfaces which assist in contracting the shanks and expanding and projecting the barbed hooks to fish-snaring positions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
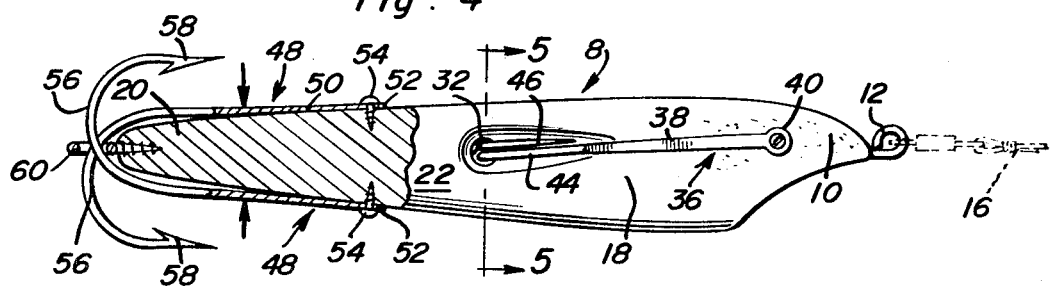
FIG. 4 is a side elevational view with the rearward portion appearing in section and which illustrates the pair of rearward hooks sprung together and the barbed hook portions projected to fish-snagging and catching positions.
Figure 5:
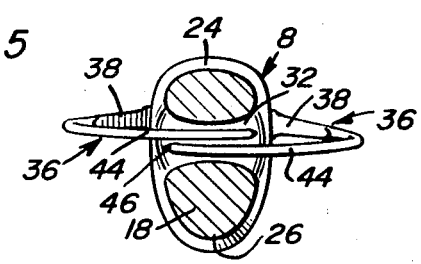

And FIG. 5 is a cross-section taken approximately on the plane of the section line 5—5 of FIG. 4.

Figure 1:
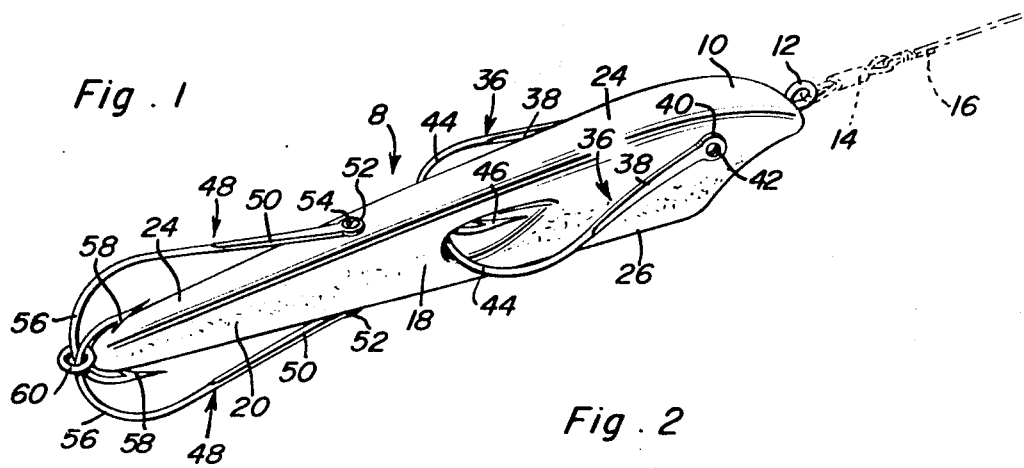
FIG. 1 is a view in perspective of a fishing plug with paired forward and rearward normally contracted snagless hooks, that is, with the barbed bill portions seated in their cocked but ready-to-expand positions.
Figure 2:
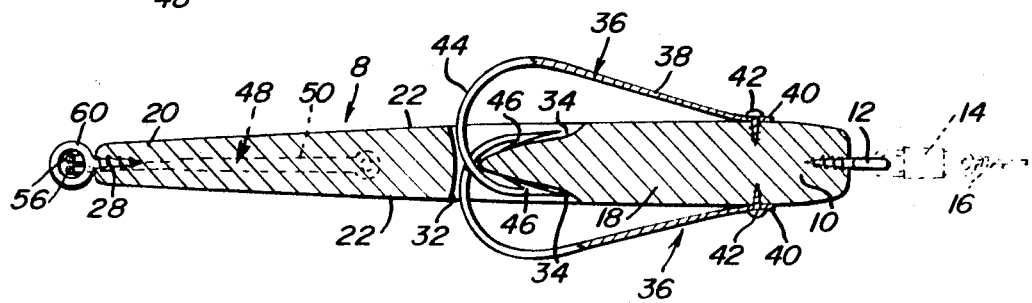
FIG. 2 is a central longitudinal sectional view, that is, with the plug in section and with the hooks appearing in their cocked positions and emphasizing the pocketed normal or retracted positions of the barbed bills of the forward pair of hooks.
Figure 3:
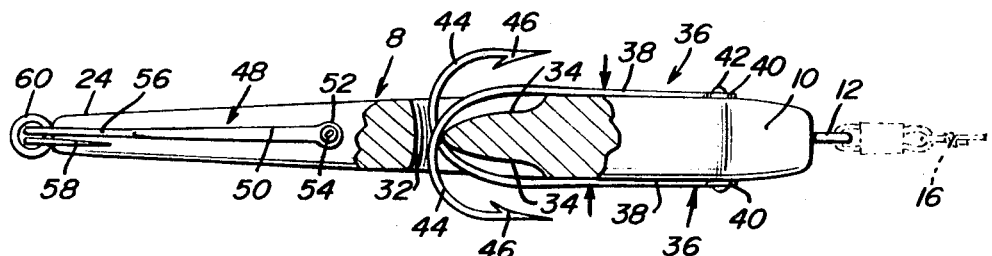
FIG. 3 is a top plan view with portions of the median part appearing in section and showing the shank portions of the forward pair of hooks collapsed or pressed toward the plug and with the barbed hooks sprung in projected fish-catching or projected relationship.

Taking up first the suitably-colored elongated buoyant plug it will be noted that it is designated, generally stated, by the numeral 8. It comprises a forward appropriately headed portion 10 at the right in FIG. 1 provided with an eye 12 to which a swivel 14 of a fishing line 16 is connected. The median body portion is denoted at 18 and the gradually tapering tail portion at 20. The opposite lengthwise side surfaces of the overall plug are denoted at 22. The lengthwise dorsal surface is denoted at 24 and the underneath ventral surface at 26. The rearward or tail end portion is provided with an eye screw 28 (FIG. 2) embodying a suitably projecting or accessible guide eye 60. The median body portion is provided with an opening which is here designated as a slot 32 and which opens through the side surfaces 22 as best shown in FIGS. 2, 3 and 5. The forward end portion of this slotted part is provided with left and right suitably proportioned recesses 34 which constitute hook seating and concealing pockets, as best illustrated in FIG. 2.

Although the paired hooks are individually the same in construction and perform in approximately the same pressure-responsive manner it is significant to point out that two pairs of hooks are provided. The first pair comprises identical companion or complemental hooks which are denoted by the numeral 36 and it is these hooks which cooperate with the slot and recess means 32 and 34. It will be noted that the shank portions are exteriorly arranged and that the curvate bends or barbed hook portions are in crossing normally cocked relationship as best shown in FIG. 2. Since both hooks are the same a description of one will suffice for both. Each hook has a shank which is distinct and different from ordinary hooks in that the major part of the shank is fashioned into a highly sensitive spring steel tang 38. The terminal flat end of the tang is fashioned into an eye 40 which is seated against the cooperable surface and is secured by a headed fastener 42. The curvate or bent portion at the rear of the shank is of usual construction and is denoted at 44 and the barbed bill or spear-shaped terminal is denoted at 46. With the hooks mounted in place the respective shanks diverge outwardly and the inherent spring tension of the tangs serves to normally seat the barbed bill portions in the recesses 34, that is, against the seating or abutment surfaces, this being the normal cocked but ready-to-function position of the barbed bills. With this construction it will be obvious that these two hooks 36, being on opposite sides of the headed portion and properly concealed, are snagless but ready to be pressed into the contracted or pressure-responsive positions shown in FIG. 2. When the fish takes the bait and squeezes on the tangs or shanks the barbed bills are projected simultaneously outward and released from their secluded pocketed positions and are then readied to snare the fish. The conditions may be such that only the forward hooks are actuated. Alternatively, the result may be such that the paired rearward hooks also are actuated. The rearward hooks are differentiated by the numeral 48 and it will be observed that the hooks are normally sprung to assume the cocked positions best shown in FIG. 1. The highly sensitive spring steel tang of the shank is denoted at 50 and has an eye 52 screwed or otherwise fastened in place at 54. The curvate bend or bent portion of one hook is denoted at 56 and overlaps or crosses over the corresponding bent portion of the other hook and the barbed bills 58 are spring-biased against the coacting intervening dorsal and ventral surfaces in the manner illustrated. The curvate barbed bill portions operate through the guide eye 60. It follows that the paired rear hooks 48 when set are yieldingly squeezed against the dorsal and ventral surfaces but are capable of being sprung out to assume the positions shown in FIG. 4 to further assist in making the catch.

Particular attention should be accorded the paired springy hooks whether provided at the forward or rearward end or at both end portions. Particularly novelty is predicated on the flat-faced highly resilient and sensitive tangs which maintain the hooks in normally cocked relationship but are sensitively responsive to jaw pressure from the fish.

It is submitted that a careful consideration of the views of the drawings taken in conjunction with the specification and the invention as claimed will enable the reader to obtain a clear and comprehensive understanding of the invention and features and advantages thereof. Accordingly, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A weedless artificial fishing lure comprising an elongated fishing plug having a forward headed end terminating in a line attaching eye, a median body portion, a rearward tail portion, longitudinal dorsal and ventral surfaces and side surfaces, said tail portion being provided with an axial outstanding guide eye, said body portion having a slot opening through exterior surfaces of said sides, said slot being provided at a forward end with outwardly opening recesses, said recesses providing hook seating surfaces and concealing pockets, a first forward pair of oriented and coordinating fishhooks, said fishhooks having resilient normally spaced shanks situated on the respectively cooperable side surfaces of the intervening headed end of said plug and fastened thereto, the curvate bends of said hooks overlapping and crossing each other and being pointed and passing in opposite directions through said slot and having barbed bill portions normally nested and sprung into said pockets and spring-biased and cocked against the respectively cooperable seating surfaces of said pockets, said barbed bill portions being projectible to fish catching positions when the fish swallows the plug and squeezes the respective shanks against the coacting side surfaces of the plug.

2. The fishing lure defined in and according to claim 1, and wherein each shank embodies a flat-faced sensitively pliant pressure responsive mounting and attaching tang.

3. The fishing lure defined in and according to claim 1, and, in combination, a second pair of oriented and coordinating fishhooks complemental to said first pair of fishhooks, said second pair of fishhooks being confined to the locale of said tail portion and arranged wholly on and being cooperable with said dorsal and ventral surfaces of the plug and having diametrically opposite resilient shanks whose forward ends are fastened to coacting surfaces of the tail portion, said shanks being sprung outwardly and spaced from the intervening tail portion, the respective barbed bill portions being directed toward and overlapping and crossing each other and passing guidingly through said outstanding guide eye, said barbed bill portions being yieldingly sprung against coacting exterior surfaces of the tail portion and thus cocked and readied to be released and projected to fish snagging positions when the shanks are responsively squeezed and thus forced toward each other.

4. The fishing lure defined in and according to claim 3, and wherein each shank of said second pair of fishhooks embodies a flat-faced highly pliant and pressure sensitive tang having a forward terminal tang-attaching eye.

5. The fishing lure defined in and according to claim 4 and wherein the first pair of hooks, which are located on the respective opposite side surfaces, are in a common plane with each other but in a plane at right angles to the plane of the dorsal and ventral mounted second pair of hooks.

6. A weedless artificial fishing lure comprising an elongated fishing plug having a forward headed end, a median body portion, a rearward tail portion, longitudinal dorsal and ventral surfaces, and complemental side surfaces, said body portion having a slot therein opening through said side surfaces, said slot being provided at a forward end with outwardly opening recesses, said recesses providing hook seating surfaces and concealing pockets, a first forward pair of oriented and coordinating fishhooks having resilient normally spaced shanks situated on the respectively cooperable side surfaces and cooperable with the intervening headed end of said plug and fastened thereto, each shank embodying a flat-faced sensitively pliant pressure responsive mounting and attaching tang, the curvate bends of said fishhooks overlapping and crossing each other and being pointed and passing in opposite directions through said slot and having barbed bill portions normally nested and sprung into said pockets and being spring-biased and cocked against the respectively cooperable seating surfaces.

7. The fishing lure defined in and according to claim 6 and, in combination, a second pair of fishhooks complemental to said first pair of fishhooks, said second pair of fishhooks being confined to the locale of said tail portion and arranged wholly on and being cooperable with said dorsal and ventral surfaces and having diametrically opposite shanks whose forward ends are coordinated with and fastened to coacting surfaces of the tail portion, said shanks being directed outwardly and being spaced from the intervening tail portion, the shank of each one of said second pair of fishhooks embodying a highly pliant and pressure sensitive tang.

* * * * *